(12) United States Patent
Deleris et al.

(10) Patent No.: US 8,751,512 B2
(45) Date of Patent: Jun. 10, 2014

(54) METHOD AND DEVICE FOR MANAGING INFORMATION IN AN AIRCRAFT

(75) Inventors: Yannick Deleris, Grenade-sur-Garonne (FR); Alexandre Broquet, Toulouse (FR); Fabien Pascal, Donneville (FR)

(73) Assignee: Airbus Operations S.A.S., Toulouse (FR)

( * ) Notice: Subject to any disclaimer, the term of this patent is extended or adjusted under 35 U.S.C. 154(b) by 304 days.

(21) Appl. No.: 12/879,775

(22) Filed: Sep. 10, 2010

(65) Prior Publication Data

US 2011/0196881 A1   Aug. 11, 2011

(30) Foreign Application Priority Data

Sep. 14, 2009 (FR) ...................................... 09 56298

(51) Int. Cl.
*G06F 17/30* (2006.01)

(52) U.S. Cl.
USPC ................ 707/752; 707/754; 701/28; 701/26

(58) Field of Classification Search
USPC ........ 707/752, 754; 701/3, 14, 538, 4, 16, 18, 701/213, 26, 28, 29.2; 715/790, 771, 808, 715/810, 856
See application file for complete search history.

(56) References Cited

U.S. PATENT DOCUMENTS

| | | | | |
|---|---|---|---|---|
| 6,466,235 B1 * | 10/2002 | Smith et al. | ................... | 715/771 |
| 6,753,891 B1 * | 6/2004 | Chohan et al. | ................ | 715/790 |
| 6,859,688 B1 * | 2/2005 | Orf et al. | ........................... | 701/3 |
| 6,868,525 B1 * | 3/2005 | Szabo | ........................... | 715/738 |
| 7,437,225 B1 * | 10/2008 | Rathinam | ...................... | 701/14 |
| 7,529,743 B1 * | 5/2009 | Ershov | .................................. | 1/1 |
| 7,610,185 B1 * | 10/2009 | Ershov | .............................. | 703/3 |
| 7,650,232 B1 * | 1/2010 | Paielli | ........................... | 701/528 |
| 7,693,621 B1 * | 4/2010 | Chamas | ........................... | 701/16 |
| 7,818,100 B2 * | 10/2010 | Goodman et al. | .............. | 701/16 |
| 7,970,764 B1 * | 6/2011 | Ershov | ........................... | 707/736 |
| 8,447,520 B2 * | 5/2013 | Gine et al. | ..................... | 701/518 |
| 8,620,493 B2 * | 12/2013 | Hughes et al. | ..................... | 701/3 |
| 2003/0009278 A1 * | 1/2003 | Mallet et al. | .................. | 701/120 |
| 2003/0093187 A1 * | 5/2003 | Walker | .............................. | 701/1 |
| 2003/0130791 A1 * | 7/2003 | McIntyre | ....................... | 701/213 |
| 2005/0187677 A1 * | 8/2005 | Walker | ........................... | 701/16 |
| 2009/0045982 A1 * | 2/2009 | Caillaud et al. | ............... | 340/972 |
| 2009/0089324 A1 * | 4/2009 | Dwyer | ........................ | 707/104.1 |
| 2009/0199205 A1 * | 8/2009 | Krishna et al. | ................ | 719/313 |
| 2009/0254403 A1 * | 10/2009 | Nagalla et al. | .................... | 705/9 |
| 2010/0241291 A1 * | 9/2010 | Konya | ............................... | 701/3 |
| 2011/0060483 A1 * | 3/2011 | Gine et al. | ......................... | 701/3 |

FOREIGN PATENT DOCUMENTS

| | | |
|---|---|---|
| CA | 2 615 913 A1 | 4/1999 |
| EP | 0 580 474 A1 | 1/1994 |
| EP | 0 780 746 A1 | 6/1997 |

\* cited by examiner

*Primary Examiner* — Jean M Corrielus

(74) *Attorney, Agent, or Firm* — Oblon, Spivak, McClelland, Maier & Neustadt, L.L.P.

(57) ABSTRACT

A method and a device for managing information in an aircraft, including at least one device for outputting information for the crew and a plurality of equipment items adapted to transmit information items capable of being outputted on the output device. After a plurality of information items from the plurality of equipment items has been acquired and a context has been determined according to a predetermined model, the plurality of information items is filtered according to at least one rule, the at least one rule being associated with the context for selection of at least one information item. At least one selected information item is then outputted on the output device.

20 Claims, 5 Drawing Sheets

METHOD AND DEVICE FOR MANAGING INFORMATION IN AN AIRCRAFT

BACKGROUND OF THE INVENTION

The present invention relates to the display of information items in an aircraft and more particularly to a method and a device for managing information in an aircraft.

The display systems of modern aircraft make it possible to inform the crew members about the state of the aircraft. The information items are generally presented on screens in the cockpit and/or in the cabin, in the form of messages and of block diagrams representative of the equipment items of the aircraft. These information items comprise continuously displayed data as well as data that can be displayed according to the phase of flight in progress and to the active alerts.

FIG. 1 illustrates a simplified example of a system, known as SD (initials for System Display in English terminology), for displaying information about the equipment items of an aircraft. As represented, this system comprises a viewing display 100 connected to equipment items 105-1 to 105-m of the aircraft, for example sensors or computers, via a selection module 110.

By way of illustration, equipment items 105-1 to 105-m are the auxiliary power monitoring unit (APU, initials for Auxiliary Power Unit in English terminology), an electrical system monitoring unit (ELEC), a hydraulic system monitoring unit (HYD) and a landing gear system monitoring unit (WHEEL).

Selection module 110 comprises automatic selection inputs associated, for example, with the alarm system of the aircraft, and manual selection inputs activated by the pilot.

The information items are generally displayed by pages, known as SD pages, according to a predetermined format. Although, in exceptions, certain pages of the display system present information items relating to several systems of the aircraft, each page in principle relates to a single system of the aircraft and presents a static view of that system.

The term "view" as used here refers to a grouping of information items. The expression "static view" or "page" refers to an invariable grouping of information items. Although the information items presented in a static view may evolve, the manner in which they are grouped does not.

These pages are used in particular to initialize the corresponding systems, to monitor them, to identify and isolate faults or else to validate a configuration. The operational procedures recommend consulting them regularly, even in the absence of any fault.

The crew may rely on each of these pages, sometimes under critical conditions, to access the right data at the right instant. These pages present static views of the systems with which they are associated, and they must contain a set of information items that make it possible to respond to different needs and to different situations. As a result, these pages are crammed. This phenomenon is exaggerated by the limited size of the display screens and the increasing complexity of equipment items of aircraft.

Moreover, depending on the situations, the needs of the crew may vary. Several different pages must then be browsed.

It is pointed out here that such static views of aircraft systems necessitate effort on the part of the crew in order to retrieve all of the information items necessary to manage a situation.

In addition, it has been observed that the definition of view plays a determining role for assimilation of information by the crew. Thus, when the situation of an aircraft is evolving from an abnormal situation to a more complex situation, for example when a new fault develops even though the first is still present, the display of new information items may be difficult for the crew to assimilate, by reason of other information items that have previously been displayed, for example in the same color.

New pages are sometimes created to respond to particular operational needs and to aid the crew in reacting correctly. Thus, to aid the crew in managing a complex situation, one or more specific pages may be created depending on the aircraft and the procedures employed. On the whole, their number increases, thus generating complexity in their management.

In addition, since the management of aircraft systems represents one of the four main tasks that a pilot must perform, simplification of access to the pertinent information items of the aircraft systems makes it possible to reduce the workload of the pilots.

SUMMARY OF THE INVENTION

The object of the invention is therefore in particular to aid the crew in accessing the pertinent information items more easily and to assist them in performing their task, especially by means of guidance mechanisms.

The object of the invention is therefore a method for managing information in an aircraft, the said aircraft comprising at least one device for outputting information for the crew and a plurality of equipment items adapted to transmit information items capable of being outputted on the said at least one outputting device, this method comprising the following steps:

acquiring a plurality of information items from the said plurality of equipment items;
determining a context according to a predetermined model;
filtering the said plurality of information items according to at least one rule, the said at least one rule being related to the said context to select at least one information item; and
outputting the said at least one selected information item.

In this way the method according to the invention makes it possible to select pertinent information items to be outputted according to detected events and a context to permit the crew members to access these information items directly, to identify them and to take appropriate action. In this way the method makes it possible to improve the efficacy of the crew while reducing its workload.

According to a particular embodiment, the method additionally comprises the following steps:

arranging information items among a plurality of selected information items; and
outputting (335) the said information items arranged according to at least one guidance rule, the said at least one guidance rule being related to the said context for selecting at least one information item.

In this way the method makes it possible to define changeovers from one view to another in order to guide the user and to permit him to follow sequences of views easily, thus improving the guidance of the user through the displayed information items.

Advantageously, the method additionally comprises a step of modifying the said filtration of the said plurality of information items and/or of the said arrangement of information items among a plurality of information items selected according to at least one predetermined guidance rule and according to the said context determined according to at least one characteristic of the said aircraft.

According to yet another particular embodiment, the said context is determined according to at least one characteristic of the said aircraft, at least one state of at least one equipment item of the said plurality of equipment items, at least one datum relating to the environment of the said aircraft and/or at least one datum relating to a user of the said method. In this way, the knowledge about the status of the aircraft, of its information items and/or that about the user make it possible to determine the pertinence of the information items to be outputted.

The said context model is preferably hierarchical, the said at least one rule being applicable to all the elements depending on a node to which the said rule is applied, the level of the said elements in the said hierarchical model being lower than that of the said node, in order to facilitate employment and maintenance of the method.

Advantageously, the method additionally comprises a step of receiving an indication representative of the detection of at least one predetermined event, the said at least one rule being associated with the said indication, thus making it possible to improve the selection of information items to be outputted and the employment of the outputting of information elements according to the concept known as "blank station".

Preferably the method additionally comprises a step of modifying the format of the said at least one selected information item, in order to facilitate its understanding by the user for whom it is destined.

Another object of the invention is a computer program comprising instructions adapted to the employment of each of the steps of the method described in the foregoing when the said program is executed on a computer, a device comprising means adapted to employment of each of the steps of this method as well as an aircraft comprising this device. The advantages achieved by this computer program and this device are similar to those cited in the foregoing.

BRIEF DESCRIPTION OF THE DRAWINGS

Other advantages, objectives and characteristics of the present invention become apparent from the detailed description hereinafter, provided by way of non-limitative example, with reference to the attached drawings, wherein.

DETAILED DESCRIPTION OF THE INVENTION

Figure 1:
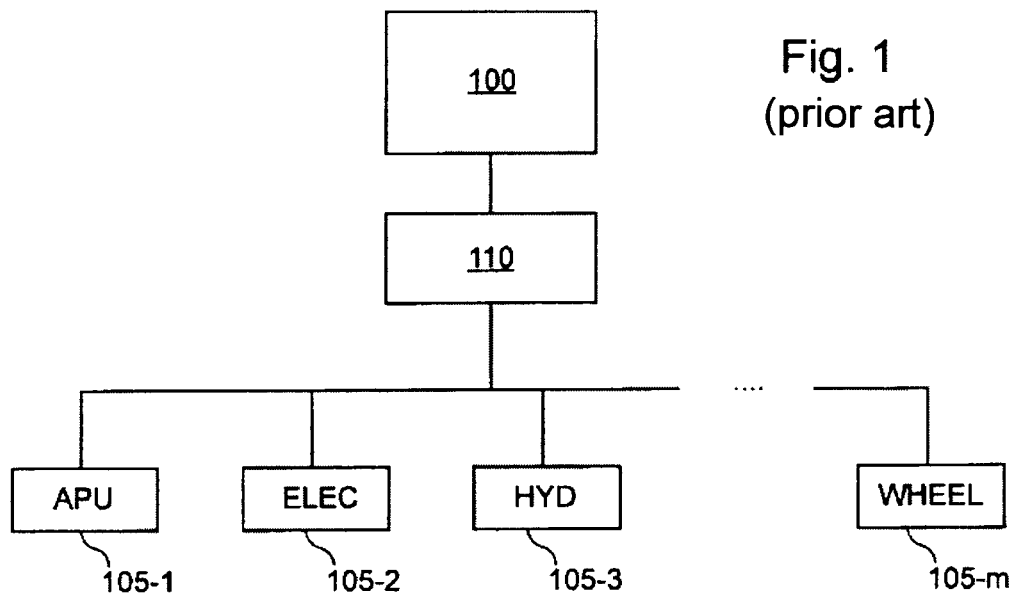
FIG. 1 illustrates a simplified example of a system for displaying information items relating to the equipment items of an aircraft.

In general, the object of the invention is a system for managing the display of information items in an aircraft cockpit, permitting a user to appraise the situation in which the aircraft finds itself, regardless of what that may be. This system preferably has the form of a software application. It is based on the combination of the following functionalities:

management of context: this function makes it possible to select the information items to be displayed according to their pertinence with regard to the context. It comprises two special features for bringing the current situation to the forefront and for permitting personalization of the display according to the needs of the user;

management of continuity of views: the purpose of this function is to define changeovers from one view to another so that the user can easily follow the sequences of views in order to improve the guidance of the user through the displayed information items.

The dynamic management of data to be displayed makes it possible to alleviate the task of management of aircraft systems by identifying the useful data at the right moment.

As indicated in the foregoing, the information items to be displayed are selected according to the context in such a way that only the useful information items are presented to the user, so that he can react in appropriate manner. Preferably the presentation of information items to be displayed is also determined by the context. In the present case, this is related to the aircraft, to its environment and to the user.

Thus the filtering of information items to be displayed is achieved according to the context specific to the aircraft, so that only the information items that may aid in mastering a particular situation are selected. The information items selected under these circumstances may be of different levels and associated with different systems of the aircraft.

In addition, the filtering of information items that have to be displayed and the presentation thereof are determined according to the user, so that only those pertinent for him are displayed. For example, only information items of a particular level may be pertinent for a particular user. Similarly, only the information items relating to particular systems of the aircraft may be pertinent for a user. This selection criterion may be based on a user or advantageously on his role, or in other words may be a function of the applications being executed. By way of illustration, the information items useful for a pilot are different from those useful for a maintenance technician.

This first selection according to the context makes it possible to optimize the quantity of information items presented to a user in a given situation in order to reduce his workload. By way of illustration, when the crew is trying to determine whether it can stop the auxiliary power unit without stopping the electrical source alone, it no longer has any need to verify the state of each electrical source of the aircraft.

In addition, management of the level of information items makes it possible to select the information items pertinent according to the context and the reasons for which information items must be displayed.

The continuity between views makes it possible to define changeovers between each view in order that a user can easily follow a sequence of views guiding him in his analysis. Such continuity may be generated in different manners, for example by vocal guidance or by displaying animated block diagrams. It depends in particular on the role of the user, or in other words on the applications being executed.

A sequence of views may be interrupted by a change of situation. It is then necessary to bring to the forefront the break in the sequence, so that it is easily identified. However, the sequence may be resumed at the place where it was interrupted, particularly when the situation returns to the state preceding the interruption. Once again, the management of interruptions and resumptions of sequences is related to the situation in which the aircraft finds itself.

Advantageously, all of the transitions between views are predetermined. Thus the guidance described here is based on knowledge of the situation of the aircraft and on the detection of events. According to this approach, the crew is essentially asked to perform actions according to the parameters at their disposal.

Thus the guidance is of the "approach by state" type. This type of guidance aims to avoid possible errors of the model by avoiding defining procedures based on the detection and interpretation of events, in contrast to guidance of the event-driven type, which defines sequences of actions to be performed by a user when an expected and known event is encountered.

A model error here denotes the type of errors committed when the user of a system develops a mistaken impression of the state of this system. This poor interpretation of the situation leads him to not take the actions necessary for improvement of this situation, or even to perform inappropriate actions that lead to aggravation of the situation.

Thus, according to the invention, the users are not asked to fully comprehend the situation in which these systems find themselves, but to take simple actions according to precise information items at their disposal and to verify that these actions have a consequence that causes the situation of these systems to evolve in the desired direction.

Finally, the simplified presentation of information items wherein only the pertinent information items are displayed permits a user to identify them rapidly. Thus the display zone here generally comprises little information or no information at a given instant, thus reinforcing the said concept of "blank station", according to which only the parameters relating to anomalies are identifiable.

The employment of the invention necessitates, preferably during its design, a phase of determination of rules that will have to be applied in order to manage the information items. A second phase aims at acquiring the data used to identify the information items to be displayed. Finally, a third phase makes it possible to select and display the information items to be displayed.

Figure 2:
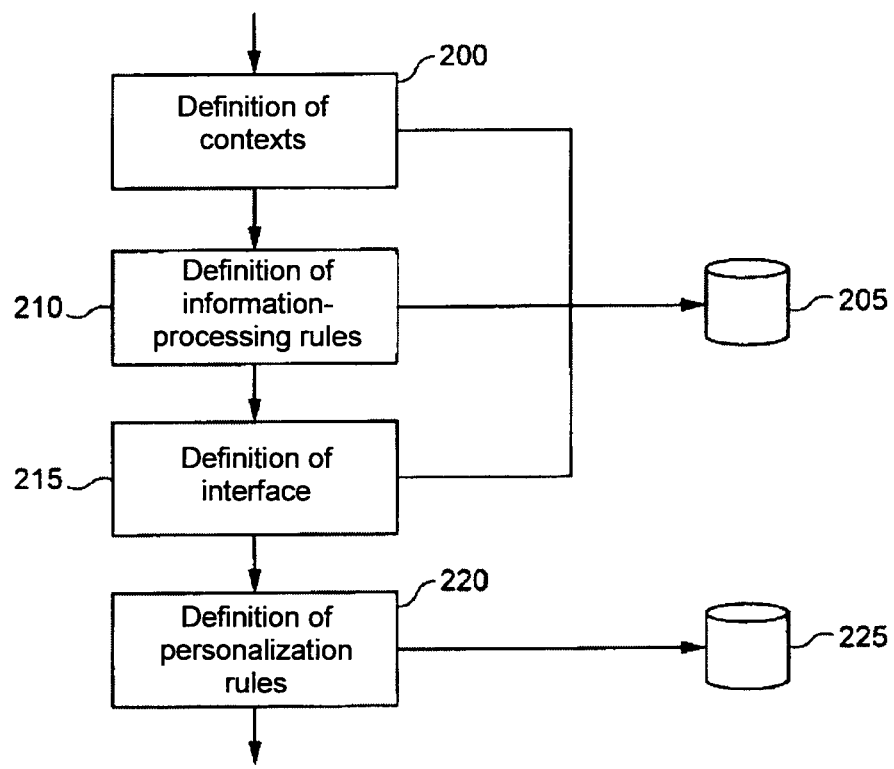
FIG. 2 schematically illustrates certain steps of an algorithm making it possible to determine the rules that have to be applied to manage the information items to be displayed.

FIG. 2 schematically illustrates certain steps of the first phase aimed at determining the rules to be applied in order to manage the information items to be displayed.

A first step (step 200) consists here in defining the context and identifying the data or parameters used to characterize it. According to a particular embodiment, it is defined according to a model having a predefined structure, preferably hierarchical, such as that illustrated in FIG. 4. As an example, this structure is stored in database 205. This step is also aimed at determination of a model for processing of particular events, such as the detection of a fire, for example.

In a subsequent step (step 210), the object is to define the rules for processing the information and/or the combination of information items, or in other words the rules that make it possible, starting from a given context, to select the information items that can be displayed among all of the information items transmitted to or accessible by the display management system. These rules are also stored in memory, here in database 205.

The man-machine interface is then defined (step 215), preferably in the form of rules, in order to permit an optimum presentation of selected information items to be displayed and changeover between views. Once again, this interface is stored in database 205 here.

It is also possible to define personalization rules (step 220), which make it possible to select certain information items to be displayed or ways of displaying them, especially according to particular needs of the crew members or of the airline company that operates the aircraft. These rules here are stored in database 225, independently of database 205, in order to permit the use of one database 205 and a plurality of databases 225, wherein that database 225 to be used is chosen according to the context.

Once they have been defined, these parameters and these rules are loaded into the information-processing system of the aircraft to permit the employment of the invention therein. These databases may also be created directly in the information-processing system of the aircraft.

Figure 3:
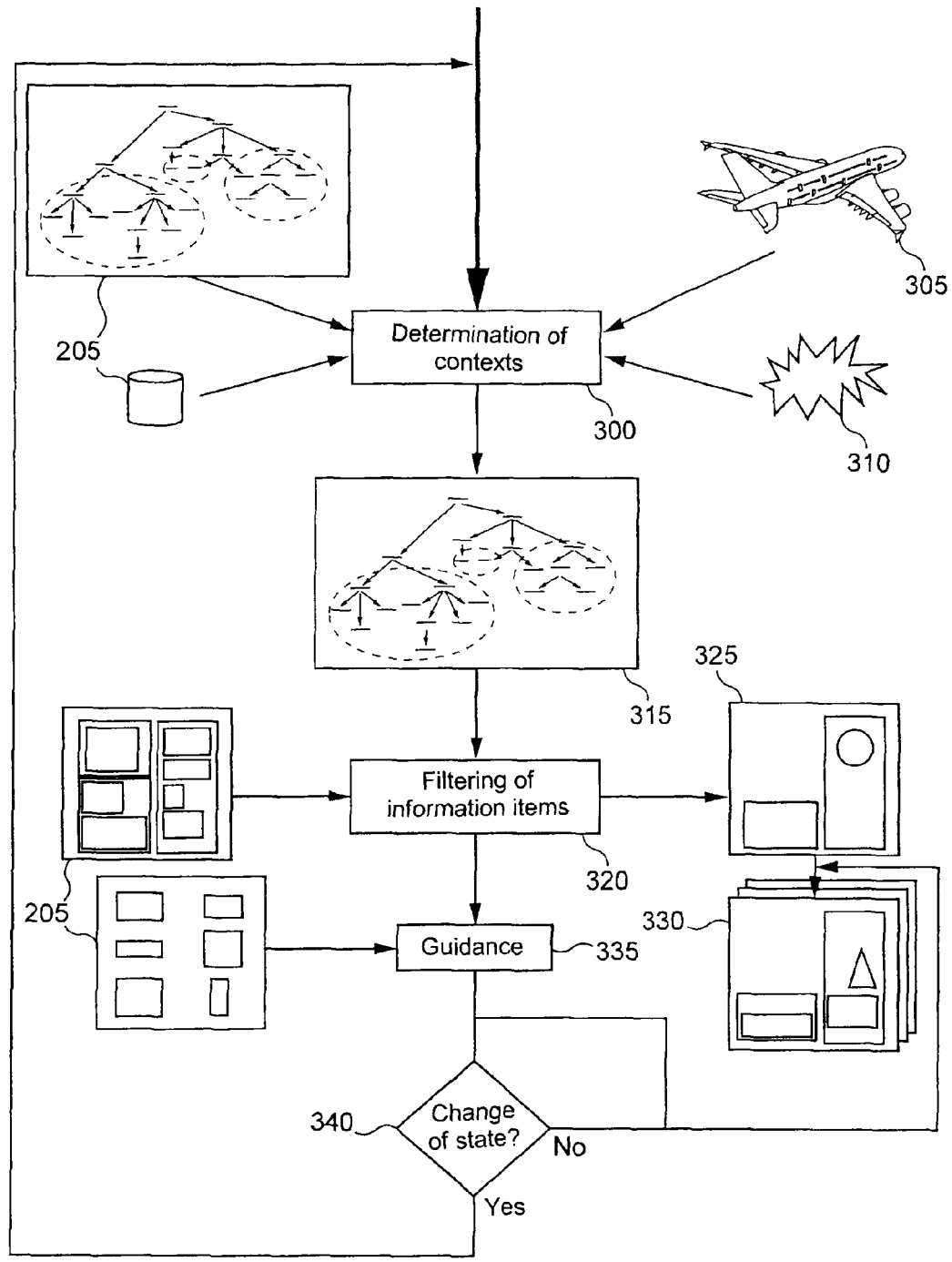
FIG. 3 schematically illustrates certain steps employed to manage the information items that have to be displayed in an aircraft according to the invention.

FIG. 3 schematically illustrates certain steps employed to manage the information items that have to be displayed in an aircraft according to the invention.

A first step (step 300) here aims to determine the context. This step is based on the one hand on the definitions of the context and of events having an impact on the management of the display of information items stored in database 205, and on the other hand on data 305 obtained in particular from the aircraft, such as data obtained from sensors or computers, and from events 310 detected in the information-processing system of the aircraft, such as the alarm system.

This step makes it possible to evaluate the context, which here is represented in the form of a situation tree (315) corresponding to the instantiated model of the context.

It is followed by a step of filtering (step 320) of information items according to the determined context and the previously determined information-processing rules, supplemented as the case may be by personalization rules. As indicated in the foregoing, these rules here are stored in databases 205 and 225, previously loaded in the aircraft. Thus the filtered data are selected among all of the data capable of being displayed, in order that only the pertinent data are displayed.

The selected data are then displayed (325). The user is able to modify the display in order to access other views, for example by modifying the display level.

Simultaneously, the transitions between views are determined, if necessary according to the context, in order to make it possible to guide the user between different views (step 335). The displayed views then evolve according to these transitions, in this way permitting changeover from a first view (325) to the following view (330) as defined in the database (205).

A test is then performed to determine whether the state of the aircraft has changed (step 340). If no change is detected, the display of selected information items continues, if necessary according to the previously determined transitions. On the other hand, if the state of the aircraft has changed, the preceding steps (steps 300 to 335) are repeated in order to determine the context and to select and display the information items to be displayed.

To define the context, or in other words the situation in which an aircraft finds itself, the data taken into account here relate to the user, to the aircraft and to its environment.

The data relating to the user are, for example, the following:

the type: this datum makes it possible to define which type of information items must be displayed. By determining, for example, whether the user is the pilot, a member of the cabin crew or a maintenance technician, it is possible on this basis to deduce that the information items to be displayed are respectively functional information items, information items relating to the cabin or information items relating to the aircraft systems;

the origin (or the airline company): this datum can be used, for example, to determine the format for display of information items, especially in the form of text or graphics, and their appearance;

the language; and the role: it makes it possible here to select the type of view. If, for example, the user is the pilot, the views must be global and of high level to permit him to appraise the functional capacities of the aircraft while permitting him to concentrate on the task of piloting. Conversely, if the user is the copilot, a flight engineer or another crew member, the pages are more precise, to permit management of the configuration of the aircraft and analysis of its environment as well as to assist the pilot.

The data relating to the configuration of the aircraft are preferably the following:

the type of aircraft: this datum is used to personalize the views and define the procedures. The type of aircraft may concern its range of action (domestic flight, medium-haul or long-haul) and the nature of the transportation (freight or passengers). For example, if a fire is detected, the procedures vary according to the aircraft and their configuration;

the type of flight: this datum is also used to personalize the views and define the procedures. As an example, it may or may not relate to the occupancy of the cabin (empty or full) or to characteristics such as ETOPS flight (acronym for Extended-range Twin-engine Operational Performance Standards in English terminology). Thus, by way of illustration, a single temperature may be indicated during a flight with an empty cabin, whereas the temperatures of each zone are displayed when the cabin is full;

the strategy of the airline company: this parameter aids in filtering the pertinent information items;

the state of resources of the aircraft: the following three states are considered here in order to determine the guidance:

normal state: all of the equipment items of the aircraft are in a normal state;

equipment items faulty: at least one equipment item is not functioning in nominal manner, meaning that at least one fault has been detected during the flight in progress. The knowledge of this datum, preferably comprising the list of faulty equipment items, makes it possible to provide guidance that does not employ a faulty equipment item; and equipment items unavailable: at least one equipment item is out of service and has led to a departure under MEL (acronym for Minimum Equipment List in English terminology). The unavailable equipment items are equipment items in which the fault was detected during a preceding flight. The knowledge of this datum, preferably comprising the list of unavailable equipment items, makes it possible to provide guidance that does not employ equipment items that have become faulty, with unavailable equipment items;

the operational phase of flight: this datum makes it possible to filter the information items to be displayed and to determine the guidance. By way of illustration, pertinent information items may be displayed when the aircraft is in flight, whereas on the ground they are replaced by information items that are more pertinent at that time.

The data relating to the environment of the aircraft are, for example, the following:

weather and visibility: this datum is used to personalize the views and define the guidance. If, for example, the weather conditions are favorable to the formation of ice, the information items relating to the deicing functions are displayed; and time: this datum is also used to personalize the views and define the procedures. Thus, for example, since external lights are necessary during the night, a corresponding indication may be displayed during the nocturnal hours and masked during the day. Similarly, since the cabin temperature may be regulated more finely during the day than during the night, the precision of the displayed temperature may vary from day to night.

It is additionally observed that certain events may be taken into consideration to determine the state of the aircraft. For example, the connection of a computer to the information-processing system to accomplish maintenance tasks makes it possible to identify the "under maintenance" state of the aircraft.

The context is determined in particular from data measured by sensors of the aircraft, processed or not, and from previously acquired and recorded data.

To determine the context precisely, all situations are envisioned. However, since their number is very large, it is not possible to define them unitarily. One solution is therefore to determine them indirectly by rules according to a tree or hierarchical structure of a context model. A rule defined for one node here is applicable to all nodes of a lower level dependent on it.

Before the information-processing rules for selecting the information items to be displayed according to the data relating to the context are defined, it is possible to qualify them according to the frequency of change of the information items.

Figure 4:
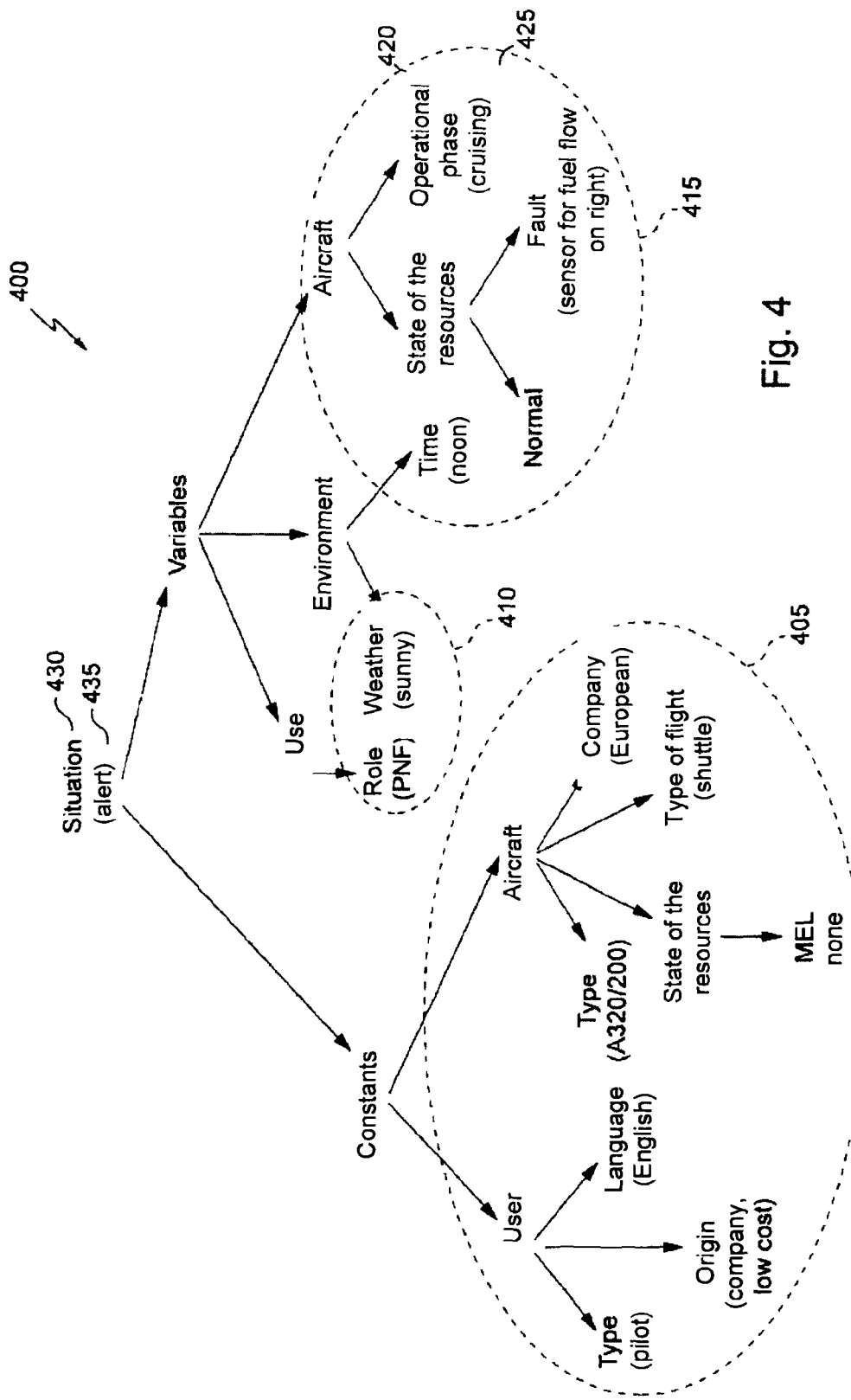
FIG. 4 illustrates an example of qualification of the rules for processing information items to be displayed according to context parameters represented in the form of a hierarchical model.

FIG. 4 illustrates an example of qualification of rules for processing information items to be displayed according to context parameters represented in the form of a hierarchical model 400. According to this example, three frequencies of change of information items are defined: the parameters that do not change during a flight (reference 405), those that change infrequently (reference 410) and those that change frequently (reference 415). The parameters that do not change during a flight are in particular the type of user, his origin and his language as well as the type of aircraft, the type of flight, the unavailable equipment items and the company. The parameters that change infrequently are, for example, the role of the user and the weather. The parameters that vary frequently in this case are the time, the operational phase and the list of faulty equipment items.

The data associated with the parameters, represented here in parentheses, define the context.

Furthermore, granularity of the information items is preferably associated with each view in order to make it possible to choose the level of detail required and thus to aid the user in grasping the situation quickly. The level of granularity of the information items to be displayed is related to the objective associated with the views. It varies from a general picture of the aircraft in its environment to precise parameters of particular systems of the aircraft. It may also concern transversal views that make it possible to visualize information items related to a particular system but having general effects on the aircraft, such as information items related to the electrical sources.

Figure 5:
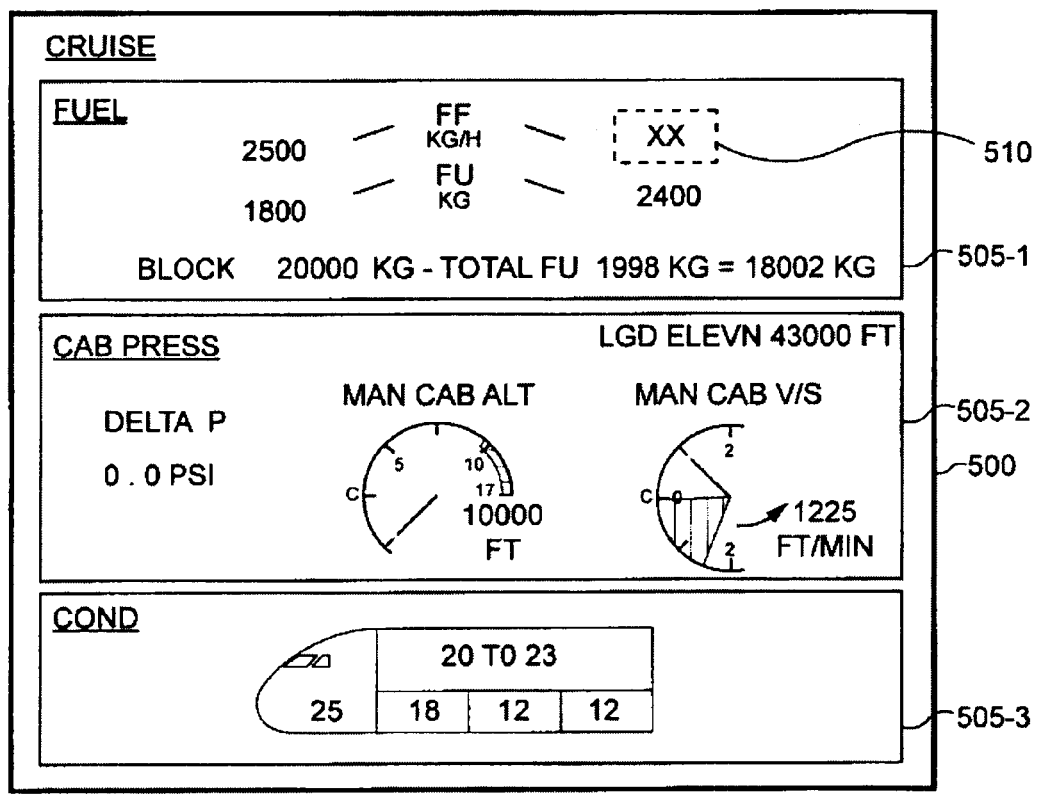
FIG. 5 represents an example of a page displayed in an aircraft cockpit comprising information items determined according to the invention.

In this way it is possible, for example, to use the following three levels of granularity:

level 1: this level represents all of the information items relating to a view. In other words, level 1 represents the identification of a view, such as a "cruising" view, relating to information items that the pilot needs during the cruising phase. A page representative of such a view is illustrated in FIG. 5 (reference 500);

level 2: this is a system level that characterizes the information items relating to a particular system of a view. For example, in the "cruising" page 500 represented in FIG. 5, the displayed information items may be related to the fuel systems (reference 505-1), to the pressurization systems (reference 505-2) and to the air conditioning systems (reference 505-3). In this way it is possible to control the display of these three data sets separately and to substitute, for one or more of these sets, one or more sets that are more pertinent with regard to the situation; and level 3: this level represents unitary information items. It is the finest level of the man-machine interface for selecting the display of information items. For example, in the "cruising" page represented in FIG. 5, it is possible to control the display of each information item independently, such as the flow of fuel supplying the right engine of the aircraft (reference 510).

Data and rules are associated with each view, for each level of the context model, as illustrated in attached Tables 1 to 4, in order to identify the information items to be displayed and their format according to the context.

Table 1 concerns level 1 of the identified view "SD ident", or in other words the level grouping the most information of this view. Each row corresponds to an indication to display an information item according to parameters of the context. Each indication here is given according to a first parameter of a first hierarchical level of the structure used to define the context and a second parameter associated with this first parameter and belonging to a lower level.

Table 2 indicates the rules that must be applied to display the selected information items, again for level 1. The rules specified in Table 2 define the format of the display of the information items of all of the views.

These tables therefore define all of the generic rules to be applied to the content of the identified page, such as the language that has to be used, the level of available information items, the type of information items and the display format.

Thus, by way of illustration, and according to Table 1, when the operational phase (first level of the hierarchical context model) is "ground" or "approach" (second level of the hierarchical context model), the information items accessed by the page "SD ident" are associated with the landing gear system (WHEEL). Similarly, in nominal situation, the information items are of high level, whereas if an alert is generated, supplementary information items of lower level will supplement the view given to the crew in order to permit it to deal more easily with the fault. The pilot here accesses a set of views that may be different from the views accessible by a technician or a member of the cabin crew.

The purpose of Table 2 is to define the color and mode of display of information items according to their nature and the context. Thus, for example, in regard to the state of aircraft resources, it is indicated that the information items relating to an element under MEL are displayed in gray, the information items relating to normally functioning elements are displayed in green and the information items relating to faulty elements are displayed with the color amber. In addition, according to the situation, the information items are displayed in traditional or flashing manner (flashing slowly or rapidly).

Table 3 relates to certain information items of level 2 for the same view, "SD ident", here the fuel level. As with Table 1, Table 3 indicates the level of information items that can be displayed (high level, intermediate level or low level). It is also indicated which values must be displayed according to the state of the elements in question. Thus, for example, no information specific to an element under MEL is displayed.

Again by way of illustration, the unit for displaying values here depends on the origin of the airline company operating the aircraft. Thus the data are displayed in liters and kilograms for European airline companies. If the format of received information items to be displayed does not correspond to the display format, the format of received information items is modified according to the display format being used.

It should be noted here that, for each table, there exists a similar table of the same level for each element of higher level associated with the identified view "SD ident".

Table 4 illustrates an example of a table associated with an element of level 3 of the view "SD ident", here the fuel flow. As represented, the purpose of Table 3 is to define the precision that must be used to display the fuel flow according to the situation.

Table 5 illustrates the selection of display rules among those given in Tables 1 to 4 according to the context defined with reference to FIG. 4. The selected rules are indicated here by the use of bold, italic and underlined characters. The employment of these rules leads to the result illustrated in FIG. 5.

As represented in FIG. 4, the operational phase (420) here is "cruising" (425). It results, according to Table 1, that the displayed page is "cruising" (CRUISE). Similarly, the situation (430) is "alert" (435). Consequently, the displayed information is, according to Tables 1 and 3, of low level, the format and the display mode being, according to Table 2, of fast flashing type and, according to Table 4, using a precision of 1.

Thus the application of all of the rules given by Tables 1 to 4 according to the context makes it possible to select the information items being displayed as well as the display mode (unit, color, etc.).

The information items provided to the user in this way contain all the data necessary for evaluating the situation of the aircraft at a given instant, or in other words in a given context.

Nevertheless, as indicated in the foregoing, a guidance function is preferably employed according to predetermined rules. These are preferably stored in memory in a guidance model, in the form of tables of rules. These are associated with the role of the user, with the aircraft and with its environment in such a way that the guidance proposed to the pilot may differ from that proposed to a technician during a maintenance phase on the ground.

The guidance models here are particularly well adapted to guide the user in situations in which one or more events is or are detected.

Table 6 illustrates an example of a guidance model for particular events. For each event indicated in the first column, and according to special features of the context such as defined in the second column, a succession of information items to be displayed is given (each row of this succession of information items here represents part of the guided sequence). Thus, by way of illustration, if an engine is on fire outside the first climbing phase, the engine thrust is displayed with a target indication corresponding to an idling speed of the engine. A command to stop the engine is then presented to the user. A command to activate a fire-extinguishing cartridge is then executed and a corresponding indication is displayed.

It is pointed out here that, since the guidance is defined by rules that depend on the context, the guidance associated with a given event may vary. For example, the procedure to be followed when one engine is on fire is not the same as that to be followed when all the engines are on fire.

Furthermore, although Tables 1 to 6 are given here in comprehensible format for illustrative purposes, they preferably are coded in an optimized format, in order to reduce the memory necessary for their storage and to facilitate their management.

Figure 6:
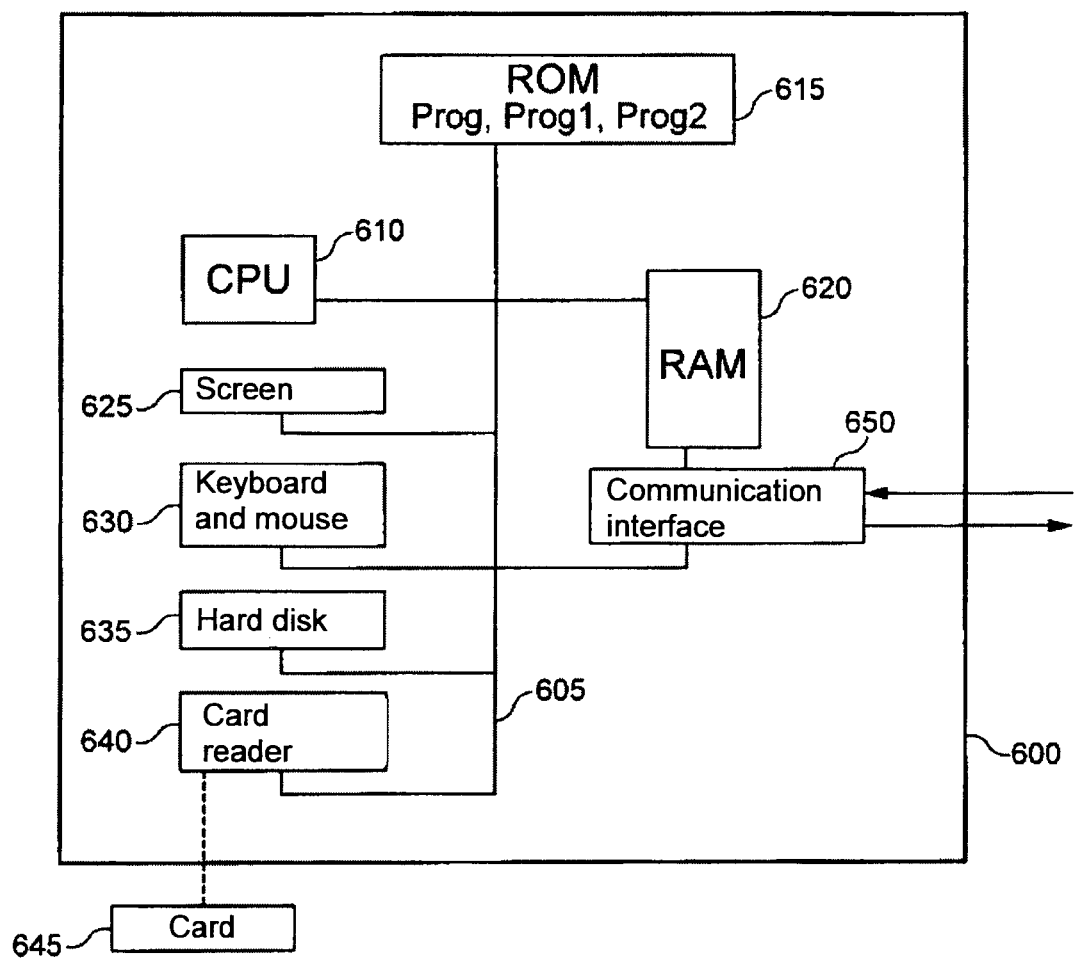
FIG. 6 illustrates an example of hardware architecture adapted to employ the invention.

FIG. 6 illustrates an exemplary hardware architecture adapted for implementing the invention, in particular the algorithm shown in FIG. 3. Device 600 here comprises a communication bus 605 to which there are connected:

- one or more central processing units or microprocessors 610 (CPU, abbreviation for Central Processing Unit in English terminology);
- a read-only memory 615 (ROM, acronym for Read Only Memory in English terminology) that can comprise the programs necessary for implementation of the invention;
- a random-access memory or cache memory 620 (RAM, acronym for Random Access Memory in English terminology) comprising registers adapted for recording variables and parameters created and modified in the course of execution of the aforesaid programs; and
- a communication interface 650 adapted for transmitting and receiving data, in particular to and from the controlled devices of the aircraft in order to monitor them and know their state.

Device 600 preferably also has the following components:

- one or more display units 625, making it possible to display data such as information items linked to the state of the aircraft and that is able to serve as a graphical interface with the user who will be able to interact with the programs according to the invention, with the aid of a keyboard and a mouse 630 or another pointing device such as a touch screen or a remote control;
- a hard disk 635 that can comprise the aforesaid programs and data processed or to be processed according to the invention; and
- a memory card reader 640 adapted for receiving a memory card 645 and reading or writing therein data processed or to be processed according to the invention.

The communication bus permits communication and interoperability among the various components included in device 600 or connected thereto. The depiction of the bus is not limitative and, in particular, the central unit is able to communicate instructions to any component of device 600 directly or via another component of device 600.

The executable code of each program permitting the programmable device to implement the processes according to the invention can be stored, for example, on hard disk 635 or in read-only memory 615.

According to a variant, memory card 645 can contain data, in particular a table of correspondence between the events detected and the commands that can be requested, as well as the executable code of the aforesaid programs which, once read by device 600, is stored on hard disk 635.

According to another variant, the executable code of the programs will be able to be received, at least partially, via interface 650, to be stored in a manner identical to that described above.

More generally, the program or programs will be able to be loaded into one of the storage means of device 600 before being executed.

Central unit 610 is going to control and direct the execution of the instructions or portions of software code of the program or programs according to the invention, which instructions are stored on hard disk 635 or in read-only memory 615 or else in the other aforesaid storage components. During boot-up, the program or programs that are stored in a non-volatile memory, for example hard disk 635 or read-only memory 615, are transferred to random access memory 620 which then contains the executable code of the program or programs according to the invention, as well as the registers for storing the variables and parameters necessary for implementation of the invention.

Naturally, to satisfy specific needs, an individual competent in the field of the invention will be able to apply modifications in the foregoing description.

ANNEX

TABLE 1

| Information | Context (level 1) | Context (level 2) | Values/rules |
|---|---|---|---|
| SD ident | Operational phase | Ground | WHEEL |
| | | Takeoff | F/CTL |
| | | Cruising | CRUISE |
| | | Approach | WHEEL |
| | Situation | Nominal | High level (few details) |
| | | Notable fact | Intermediate level (more precise view of the notable fact) |
| | | Alarm (amber) | Low level (details of the parameters associated with the alarm) |
| | | Alarm (red) | Low level (details of the parameters associated with the alarm as well as details of the entire aircraft function in question) |
| | User | Language | English |
| | Type | Pilot | System pages only |
| | | Maintenance | All |
| | | Cabin crew | Cruising page only |

TABLE 2

| | Element | Value | Rule |
|---|---|---|---|
| SD IHM | State of resources of the aircraft | MEL element | Gray |
| | | Nominal | Green |
| | | Fault | Amber |
| | Situation | Nominal | Normal |
| | | Notable fact | Flashing slowly |
| | | Alarm (amber) | Flashing rapidly |
| | | Alarm (red) | Flashing rapidly |

TABLE 3

| Information | Context (level 1) | Context (level 2) | Values/rules |
|---|---|---|---|
| Fuel level | Situation | Nominal | High level |
| | | Notable fact | Intermediate level |
| | | Alarm (amber) | Low level |
| | | Alarm (red) | Low level |
| | State of resources of the aircraft | MEL element | Display of the symbology signifying "Unavailable" |
| | | Nominal | Display of the value |
| | | Fault | Display 'XX' |
| | Airline company | US | Units: QT, LBS |
| | | Europe | Units: L, KG |

TABLE 4

| Information | Context (level 1) | Context (level 2) | Values/rules |
|---|---|---|---|
| IHM fuel flow | Situation | Nominal | Precision 100 |
| | | Notable fact | Precision 10 |
| | | Alarm | Precision 1 |

TABLE 5

| Information | Context (level 1) | Context (level 2) | Values/rules |
|---|---|---|---|
| SD ident | Operational phase | Ground | WHEEL |
| | | Takeoff | F/CTL |
| | | Cruising | CRUISE |
| | | Approach | WHEEL |
| | Situation | Nominal | High level |
| | | Notable fact | Intermediate level |
| | | Alarm (amber) | Low level |
| | | Alarm (red) | Low level |
| | User | Language | English |
| | Type | Pilot | System pages only |
| | | Maintenance | All |
| | | Cabin crew | Cruising page only |
| SD IHM | State of resources of the aircraft | MEL element | Gray |
| | | Nominal | Green |
| | | Fault | Amber |
| Fuel level | Situation | Nominal | Normal |
| | | Notable fact | Flashing slowly |
| | | Alarm (amber) | Flashing rapidly |
| | | Alarm (red) | Flashing rapidly |
| | Situation | Nominal | High level |
| | | Notable fact | Intermediate level |
| | | Alarm (amber) | Low level |
| | | Alarm (red) | Low level |
| | State of resources of the aircraft | MEL element | Display of "Unavailable" |
| | | Nominal | Display of the value |
| | | Fault | Display 'XX' |
| | Airline company | US | Units: QT, LBS |
| | | Europe | Units: L, KG |
| IHM fuel flow | Situation | Nominal | Precision 100 |
| | | Notable fact | Precision 10 |
| | | Alarm | Precision 1 |

TABLE 6

| Event | Specificity of the context | Guidance |
|---|---|---|
| Request for landing configuration | Flying under nominal conditions | Display the reference barometric value ('Baro ref'), permit its modification and present a validation command<br>Display the value 'Minima', permit its modification and present a validation command<br>Turn on the "Seat belt ON" command button |
| | At least one fault has been detected during the flight | Display the general state of the aircraft, present the operational limitations and activate a verification command<br>Display the reference barometric value ('Baro ref'), permit its modification and present a validation command<br>Display the value 'Minima', permit its modification and present a validation command<br>Present the command to display "Seat belt ON" |
| Engine on fire | During the first part of the climbing phase | Ignore the problem |
| | The rest of the time | Display the engine thrust as well as an idling reference symbol<br>Present the command to stop the engine<br>Activate the extinguishing cartridge command and display a corresponding indication |
| Fault of a fuel pump | On the ground or while cruising | Activate the command to stop the faulty pump, display a corresponding indication and deactivate the command of all the other pumps |
| | The rest of the time | Ignore the problem |

The invention claimed is:

1. A method for managing information in an aircraft, the aircraft including at least one output device configured to output information for a crew, and a plurality of equipment items configured to transmit information items capable of being outputted on the at least one output device, the method comprising:
   acquiring a plurality of information items from the plurality of equipment items;
   determining a context, the context corresponding to an instantiation of a predetermined hierarchical context model that has a tree structure;
   filtering the plurality of information items based on at least one rule;
   selecting at least one information item from the plurality of information items, the at least one rule being associated with the determined context and being applicable to all elements that depend on a node of the model to which the rule is applied, a level of the elements in the hierarchical model being lower than that of the node;
   outputting on a display of the at least one output device the at least one selected information item based on the determined context; and
   simultaneously with said outputting on the display, determining all of a plurality of available transitions between different views associated with said outputting on the display, based on the determined context, to provide guidance between the different views.

2. The method according to claim 1, further comprising:
   arranging information items among a plurality of selected information items; and
   outputting the information items arranged according to at least one guidance rule, the at least one guidance rule being related to the determined context.

3. The method according to claim 2, further comprising:
   modifying at least one of said filtering the plurality of information items and said arranging the information items among a plurality of information items selected according to at least one predetermined guidance rule and according to the context determined according to at least one characteristic of the aircraft.

4. The method according to claim 1, wherein the determined context is determined based on one or more of at least one characteristic of the aircraft, at least one state of at least one equipment item of the plurality of equipment items, at least one datum relating to an environment of the aircraft, and at least one datum relating to a user.

5. The method according to claim 1, further comprising:
receiving an indication representative of detection of at least one predetermined event, the at least one rule being associated with the indication.

6. The method according to claim 1, further comprising:
modifying a format of the at least one selected information item.

7. The method according to claim 1, wherein the determined context is defined according to a situation in which the aircraft is in.

8. The method according to claim 1, wherein the determined context is defined according to a user of the aircraft.

9. The method according to claim 1, wherein the determined context is defined according to an environment of the aircraft.

10. The method according to claim 1, wherein the displayed views evolve with each of the transitions.

11. The method according to claim 1, wherein said outputting the at least one selected information item based on the determined context on the display includes presenting the at least one selected information item based on a blank station methodology.

12. The method according to claim 1, further comprising:
determining whether a predetermined state of the aircraft has changed;
continuing said outputting based on the determined transitions regarding the different views when, responsive to said determining the predetermined state, the predetermined state of the aircraft has not changed; and
repeating said acquiring, said determining, said filtering, said outputting, and said determining when, responsive to said determining the predetermined state, the predetermined state of the aircraft has changed.

13. The method according to claim 1,
wherein said acquiring and said determining are performed responsive to an unexpected event, and
wherein a first occurrence of said outputting causes the display to switch from a blank screen to display of only the at least one selected information item on the display, the at least one selected information item on the display being one or more parameters relating to anomalies caused by the unexpected event.

14. The method according to claim 1, wherein said outputting on the display the at least one selected information item includes outputting on the display, at the same time, a plurality of output level display portions of different granularities, including a first level display portion, a second level display portion, and a third level display portion.

15. The method according to claim 14, wherein the first level display portion represents all of the information items relating to a view, the second level display portion represents a system level that characterizes information items relating to a particular system of the view of the first level display portion, and the third level display portion represents unitary information items.

16. A non-transitory computer-readable storage medium storing executable instructions which when executed by a processor perform a method for managing information in an aircraft, the aircraft including at least one output device configured to output information for a crew, and a plurality of equipment items configured to transmit information items capable of being outputted on the at least one output device, the method comprising:
acquiring a plurality of information items from the plurality of equipment items;
determining a context, the context corresponding to an instantiation of a predetermined hierarchical context model that has a tree structure;
filtering the plurality of information items based on at least one rule;
selecting at least one information item from the plurality of information items, the at least one rule being associated with the determined context and being applicable to all elements that depend on a node of the model to which the rule is applied, a level of the elements in the hierarchical model being lower than that of the node;
outputting on a display of the at least one output device the at least one selected information item based on the determined context; and
simultaneously with said outputting on the display, determining all of a plurality of available transitions between different views associated with said outputting on the display, based on the determined context, to provide guidance between the different views.

17. A device configured to perform the method according to claim 1.

18. An aircraft including the device of claim 17.

19. The non-transitory computer-readable storage medium according to claim 16, wherein said outputting the at least one selected information item based on the determined context on the display includes presenting the at least one selected information item based on a blank station methodology, where a first occurrence of said outputting causes the display to switch from a blank screen to display of only the at least one selected information item on the display.

20. The non-transitory computer-readable storage medium according to claim 16, further comprising:
determining whether a predetermined state of the aircraft has changed;
continuing said outputting based on the determined transitions regarding the different views when, responsive to said determining the predetermined state, the predetermined state of the aircraft has not changed; and
repeating said acquiring, said determining, said filtering, said outputting, and said determining when, responsive to said determining the predetermined state, the predetermined state of the aircraft has changed.

\* \* \* \* \*